United States Patent
Aoki et al.

(10) Patent No.: US 11,192,120 B2
(45) Date of Patent: Dec. 7, 2021

(54) CENTRIFUGAL FIELD-FLOW FRACTIONATION DEVICE

(71) Applicant: SHIMADZU CORPORATION, Kyoto (JP)

(72) Inventors: Kengo Aoki, Kyoto (JP); Hiroki Honda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 369 days.

(21) Appl. No.: 16/472,374

(22) PCT Filed: Dec. 18, 2017

(86) PCT No.: PCT/JP2017/045352
§ 371 (c)(1),
(2) Date: Jun. 21, 2019

(87) PCT Pub. No.: WO2018/117032
PCT Pub. Date: Jun. 28, 2018

(65) Prior Publication Data
US 2019/0358649 A1 Nov. 28, 2019

(30) Foreign Application Priority Data

Dec. 22, 2016 (JP) .............................. JP2016-248806

(51) Int. Cl.
*B04B 1/02* (2006.01)
*B03B 5/34* (2006.01)
(Continued)

(52) U.S. Cl.
CPC .................. *B04B 1/02* (2013.01); *B03B 5/34* (2013.01); *B04B 11/02* (2013.01); *B04B 13/00* (2013.01); *G01N 1/10* (2013.01); *G01N 15/042* (2013.01)

(58) Field of Classification Search
CPC B04B 1/02; B04B 11/02; B04B 13/00; B04B 2005/045; B04B 5/0442;
(Continued)

(56) References Cited

U.S. PATENT DOCUMENTS

2014/0066280 A1* 3/2014 Welz ........................ B04B 9/12
494/23

FOREIGN PATENT DOCUMENTS

| EP | 2 524 732 A1 | 11/2012 |
| EP | 2 524 733 A1 | 11/2012 |
| JP | 2014-518761 A | 8/2014 |

OTHER PUBLICATIONS

Written Opinion of the International Searching Authority of PCT/JP2017/045352 dated Mar. 6, 2018.
(Continued)

*Primary Examiner* — Walter D. Griffin
*Assistant Examiner* — Shuyi S. Liu
(74) *Attorney, Agent, or Firm* — Sughrue Mion, PLLC

(57) ABSTRACT

Provided is a centrifugal field-flow fractionation device that can stably press a fixing member toward an inner peripheral surface of a rotor by a wedge-shaped member, even when a relatively large centrifugal force acts on the wedge-shaped member. An arc-shaped (C-shaped) fixing member 17 is provided along an inner peripheral surface of a channel member 16 on a side of a rotation axis of the channel member 16. A wedge-shaped member 18 is attached between opposite ends of the fixing member 17 and applies a force in a direction of spreading the opposite ends apart, to thereby press the fixing member 17 toward the inner peripheral surface of the rotor 14. The wedge-shaped member 18 has a pair of contact surfaces 184 that respectively come into contact with the opposite ends of the fixing member 17. The pair of contact surfaces 184 include tapered surfaces that gradually taper down toward the rotor 14, so (Continued)

that the distance between the contact surfaces 184 gradually shortens as the contact surfaces 184 come close to the rotor 14.

6 Claims, 10 Drawing Sheets

(51) Int. Cl.
*B04B 11/02* (2006.01)
*B04B 13/00* (2006.01)
*G01N 1/10* (2006.01)
*G01N 15/04* (2006.01)

(58) Field of Classification Search
CPC .......... B03B 5/34; G01N 1/10; G01N 15/042; G01N 2030/002; G01N 30/0005; G01N 15/02
USPC .......................................................... 494/23
See application file for complete search history.

(56) References Cited

OTHER PUBLICATIONS

International Search Report of PCT/JP2017/045352 dated Mar. 6, 2018.

* cited by examiner

CENTRIFUGAL FIELD-FLOW FRACTIONATION DEVICE

TECHNICAL FIELD

The present invention relates to a centrifugal field-flow fractionation device that allows a liquid sample to flow into a channel provided along an inner peripheral surface of an annular rotor, and rotates the rotor to classify particles in the liquid sample in the channel by centrifugal force.

BACKGROUND ART

Field flow fractionation is known as a method of classifying particles contained in a liquid sample according to size and specific gravity. For example, Patent Document 1 below discloses an example of a centrifugal field-flow fractionation device that classifies particles in a liquid sample by centrifugal force, by allowing a liquid sample to flow into a channel and rotating the channel.

The centrifugal field-flow fractionation device includes, for example, a rotor, a channel member, a fixing member, and the like. The rotor is formed in an annular shape, and is held so as to be rotatable about a rotation axis. The channel member has, for example, a three-layer structure, and layers are sequentially stacked in a state where each layer is curved in an arc shape along an inner peripheral surface of the rotor. The fixing member is a C-shaped (arc-shaped) member extending in an arc shape along an inner peripheral surface (layer closest to rotation axis) of the channel member.

The layers forming the channel member are each formed in a long shape, and include: an intermediate layer (see FIG. 5 in Patent Document 1) in which an opening extending in the longitudinal direction is formed; and an outer surface layer and an inner surface layer (see FIGS. 4(a) and 4(b) in Patent Document 1) that close the outer side and inner side of the opening by sandwiching the intermediate layer, to thereby form a channel. The inner surface layer has an inlet and an outlet, each of which is a through hole communicating with the channel. A liquid sample is allowed to flow into the channel through the inlet, and flow out from the channel through the outlet.

The layers of the channel member as described above are stacked in a state where the layers are curved along an outer peripheral surface of the fixing member, and are attached to the fixing member with a bolt or a pin. The fixing member to which the channel member is attached is inserted into a space on the inner side of the rotor, and is fixed along the inner peripheral surface of the rotor so as to sandwich the channel member with the rotor. At this time, by attaching a wedge-shaped member between opposite ends of the C-shaped fixing member, a force is applied in a direction of spreading the opposite ends apart (see FIG. 6 in Patent Document 1). As a result, the C-shaped fixing member is fixed by being strongly pressed toward the inner peripheral surface of the rotor, and the channel member is sandwiched between the fixing member and the rotor.

In the centrifugal field-flow fractionation device assembled as described above, centrifugal force can be applied to the liquid sample in the channel, by rotating the rotor and thereby rotating the channel member attached to the rotor. As a result, particles contained in the liquid sample flowing into the channel from the inlet flow out from the outlet at different timings depending on the size and specific gravity, whereby the particles in the liquid sample are classified according to size and specific gravity.

PRIOR ART DOCUMENT

Patent Document

Patent Document 1: JP 2014-518761 A

SUMMARY OF THE INVENTION

Problems to be Solved by the Invention

However, with the wedge-shaped member as disclosed in Patent Document 1 described above, when centrifugal force acts as the rotor rotates, the force acting on the opposite ends of the C-shaped fixing member from the wedge-shaped member weakens. This may adversely affect the classification, and may cause leakage of the liquid sample in the channel.

Specifically, as shown in FIG. 6(e), the wedge-shaped member disclosed in Patent Document 1 described above has a pair of contact surfaces (right and left surfaces in FIG. 6(e)) that abut on the opposite ends of the C-shaped fixing member. A distance between the right and left surfaces gradually increases toward the rotor (upper side in FIG. 6(e)). For this reason, when a relatively large centrifugal force acts on the wedge-shaped member from a side of the central axis of the rotor toward the rotor (from lower side to upper side in FIG. 6(e)), the pair of contact surfaces of the wedge-shaped member are likely to shift to the rotor side from the opposite ends of the fixing member. This may weaken the force acting in the direction of spreading the opposite ends of the fixing member apart.

In such a case, the force of pressing the channel member toward the rotor by the fixing member is weakened. This may change the height of the channel in the channel member, or in some cases, may create a gap between the layers of the channel member and cause leakage of the liquid sample. As described above, in the conventional centrifugal field-flow fractionation device, there has been a possibility that the force of pressing the fixing member toward the inner peripheral surface of the rotor by the wedge-shaped member becomes insufficient when a relatively large centrifugal force acts on the wedge-shaped member.

The present invention has been made in view of the circumstances, and aims to provide a centrifugal field-flow fractionation device that can stably press a fixing member toward the inner peripheral surface of a rotor by a wedge-shaped member, even when a relatively large centrifugal force acts on the wedge-shaped member.

Means for Solving the Problems

A centrifugal field-flow fractionation device according to the present invention includes an annular rotor, an arc-shaped channel member, an arc-shaped fixing member, a wedge-shaped member, and a rotary actuator. The rotor rotates about a rotation axis. The channel member is provided along an inner peripheral surface of the rotor, has an arc-shaped outer peripheral surface formed on a side of the rotor and an arc-shaped inner peripheral surface formed on a side of the rotation axis, includes a channel for a liquid sample, and has an inlet in which the liquid sample flows into the channel and an outlet in which the liquid sample flows out from the channel. The fixing member is provided along the inner peripheral surface of the channel member on the side of the rotation axis with respect to the channel member. The wedge-shaped member is attached between opposite ends of the fixing member and applies a force in a direction of spreading the opposite ends apart, so that the fixing member is pressed toward the inner peripheral surface of the rotor. The rotary actuator rotates the rotor to classify particles in the liquid sample in the channel by centrifugal force. The wedge-shaped member has a pair of contact surfaces that come into contact with the opposite ends of the fixing member. The pair of contact surfaces include tapered surfaces that gradually taper down toward the rotor, so that a distance between the contact surfaces shortens as contact surfaces come close to the rotor.

According to such a configuration, the pair of contact surfaces of the wedge-shaped member respectively come into contact with the opposite ends of the fixing member, and apply force in a direction of spreading the opposite ends apart. Thus, the fixing member is pressed toward the inner peripheral surface of the rotor. The pair of contact surfaces include tapered surfaces that gradually taper down toward the rotor, so that a distance between the contact surfaces gradually shortens as the contact surfaces come close to the rotor. Hence, even when a relatively large centrifugal force acts on the wedge-shaped member, the pair of contact surfaces of the wedge-shaped member are less likely to shift to the rotor side from the opposite ends of the fixing member. This prevents centrifugal force from weakening the force of the wedge-shaped member acting in the direction of spreading the opposite ends of the fixing member apart. Hence, the wedge-shaped member can stably press the fixing member toward the inner peripheral surface of the rotor.

The wedge-shaped member may have an adjustment mechanism configured to adjust the distance between the pair of contact surfaces.

According to such a configuration, by using the adjustment mechanism to adjust the distance between the pair of contact surfaces, it is possible to adjust the force of the wedge-shaped member acting in the direction of spreading the opposite ends of the fixing member apart. This effectively prevents centrifugal force from weakening the force of the wedge-shaped member acting in the direction of spreading the opposite ends of the fixing member apart. Hence, the wedge-shaped member can press the fixing member even more stably toward the inner peripheral surface of the rotor.

Moreover, since there is no need to provide a screw hole in the rotor to attach the wedge-shaped member, it is possible to prevent stress concentration in the rotor. Accordingly, the rotor need not be upsized to prevent breakage of the rotor caused by stress concentration, and therefore the entire device need not be upsized.

The wedge-shaped member may have a pair of displacement portions respectively provided with the pair of contact surfaces, and one bolt portion. In this case, relative displacement of the pair of displacement portions caused by rotation of the bolt portion may change the distance between the pair of contact surfaces.

According to such a configuration, the distance between the pair of contact surfaces can be changed by relatively displacing the pair of displacement portions, by simply rotating one bolt portion. Accordingly, it is possible to easily and appropriately adjust the force of the wedge-shaped member acting in the direction of spreading the opposite ends of the fixing member apart.

The bolt portion may have two shaft portions extending in opposite directions along the axial direction, one of the shaft portions has a right-handed screw and the other of shaft portions has a left-handed screw.

According to such a configuration, the two shaft portions extending in opposite directions along the axial direction can be simultaneously rotated by simply rotating one bolt portion. At this time, since one shaft portion has the right-handed screw and the other shaft portion has the left-handed screw. Hence, the pair of displacement portions can be relatively displaced efficiently with rotation of the bolt portion. Thus, the distance between the pair of contact surfaces can be easily changed only by rotating the bolt portion by a small rotation amount. This improves work efficiency.

The pair of contact surfaces may include a positioning portion configured to position the wedge-shaped member between the opposite ends of the fixing member.

According to such a configuration, the wedge-shaped member is positioned between the opposite ends of the fixing member through the positioning portion. Hence, it is possible to prevent shifting of the contact position of the pair of contact surfaces on the opposite ends of the fixing member. Accordingly, the wedge-shaped member can more stably press the fixing member toward the inner peripheral surface of the rotor. In addition, with the configuration where the bolt portion is rotated to change the distance between the pair of contact surfaces, it is possible to prevent rotation of the entire wedge-shaped member with the rotation of the bolt portion. This improves work efficiency.

Another centrifugal field-flow fractionation device according to the present invention includes an annular rotor, an arc-shaped channel member, an arc-shaped fixing member, a wedge-shaped member, and a rotary actuator. The rotor rotates about a rotation axis. The channel member is provided along an inner peripheral surface of the rotor, has an arc-shaped outer peripheral surface formed on a side of the rotor and an arc-shaped inner peripheral surface formed on a side of the rotation axis, includes a channel for a liquid sample, and has an inlet in which the liquid sample flows into the channel and an outlet in which the liquid sample flows out from the channel. The fixing member is provided along the inner peripheral surface of the channel member on the side of the rotation axis with respect to the channel member. The wedge-shaped member is attached between opposite ends of the fixing member and applies a force in a direction of spreading the opposite ends apart, so that the fixing member is pressed toward the inner peripheral surface of the rotor. The rotary actuator rotates the rotor to classify particles in the liquid sample in the channel by centrifugal force. The wedge-shaped member has a pair of contact surfaces that respectively come into contact with the opposite ends of the fixing member, and an adjustment mechanism configured to adjust a distance between the pair of contact surfaces.

According to such a configuration, the pair of contact surfaces of the wedge-shaped member respectively come into contact with the opposite ends of the fixing member, and apply force in a direction of spreading the opposite ends apart. Thus, the fixing member is pressed toward the inner peripheral surface of the rotor. Then, by using the adjustment mechanism to adjust the distance between the pair of contact surfaces, it is possible to adjust the force of the wedge-shaped member acting in the direction of spreading the opposite ends of the fixing member apart. This prevents centrifugal force from weakening the force of the wedge-shaped member acting in the direction of spreading the opposite ends of the fixing member apart. Hence, the wedge-shaped member can stably press the fixing member toward the inner peripheral surface of the rotor.

Moreover, since there is no need to provide a screw hole in the rotor to attach the wedge-shaped member, it is possible to prevent stress concentration in the rotor. Accordingly, the rotor need not be upsized to prevent breakage of the rotor caused by stress concentration, and therefore the entire device need not be upsized.

Effects of the Invention

According to the present invention, it is possible to prevent centrifugal force from weakening the force of a wedge-shaped member acting in the direction of spreading the opposite ends of a fixing member apart. Hence, the wedge-shaped member can stably press the fixing member toward the inner peripheral surface of a rotor.

MODE FOR CARRYING OUT THE INVENTION

Figure 1:
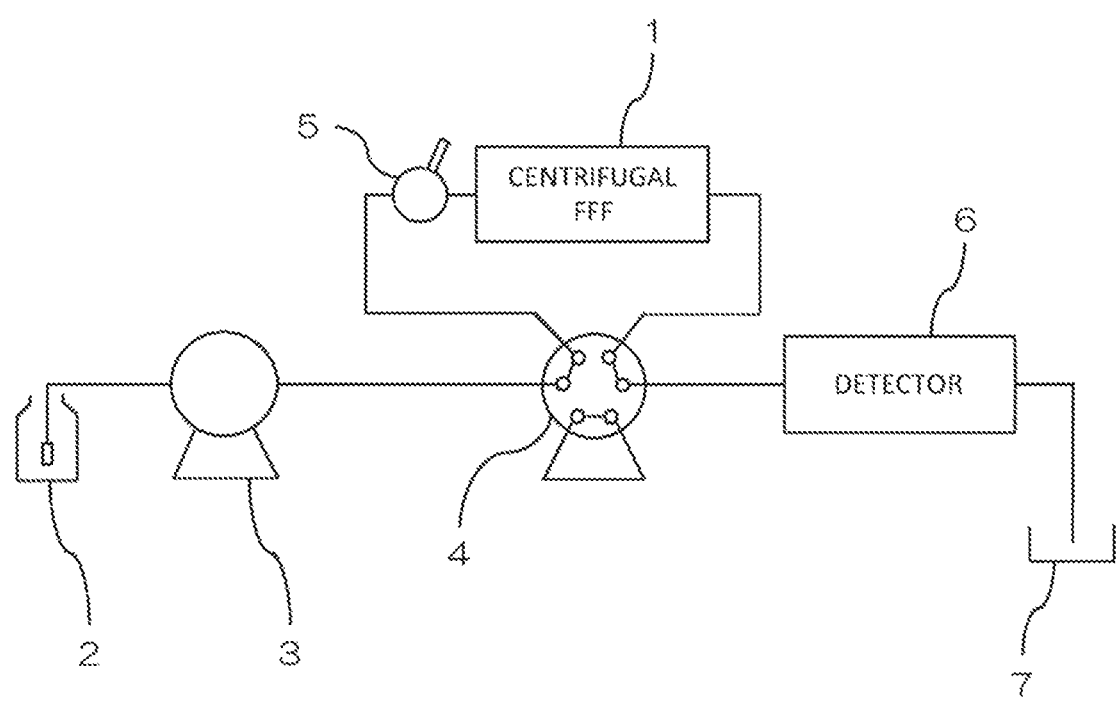
FIG. 1 is a schematic view showing a configuration example of an analysis system including a centrifugal field-flow fractionation device of an embodiment of the present invention.

FIG. 1 is a schematic view showing a configuration example of an analysis system including a centrifugal field-flow fractionation device 1 of an embodiment of the present invention. The centrifugal field-flow fractionation device 1 is a device for classifying particles contained in a liquid sample according to size and specific gravity using field flow fractionation. The analysis system shown in FIG. 1 includes a carrier storage unit 2, a liquid feed pump 3, a rotary valve 4, a sample injection device 5, a detector 6, and a carrier collection unit 7 in addition to the centrifugal field-flow fractionation device 1.

The carrier storage unit 2 stores a carrier fluid made of water or an organic solvent, for example. The carrier fluid is pumped out of the carrier storage unit 2 by the liquid feed pump 3, and is supplied to the centrifugal field-flow fractionation device 1 through the rotary valve 4. The sample injection device 5 is provided between the rotary valve 4 and the centrifugal field-flow fractionation device 1, and the carrier fluid into which a sample is injected from the sample injection device 5 is supplied to the centrifugal field-flow fractionation device 1 as a liquid sample.

The liquid sample contains a large number of particles to be analyzed. The particles contained in the liquid sample are classified by being subjected to a centrifugal force in the centrifugal field-flow fractionation device 1, and flow out from the centrifugal field-flow fractionation device 1 at different timings depending on the size and specific gravity. The particles that sequentially flow out from the centrifugal field-flow fractionation device 1 are sent to the detector 6 together with the carrier fluid through the rotary valve 4, and after being detected by the detector 6, the particles are collected by the carrier collection unit 7. The start or stop of the liquid sample supply to the centrifugal field-flow fractionation device 1 can be switched by rotating the rotary valve 4.

Figure 2:
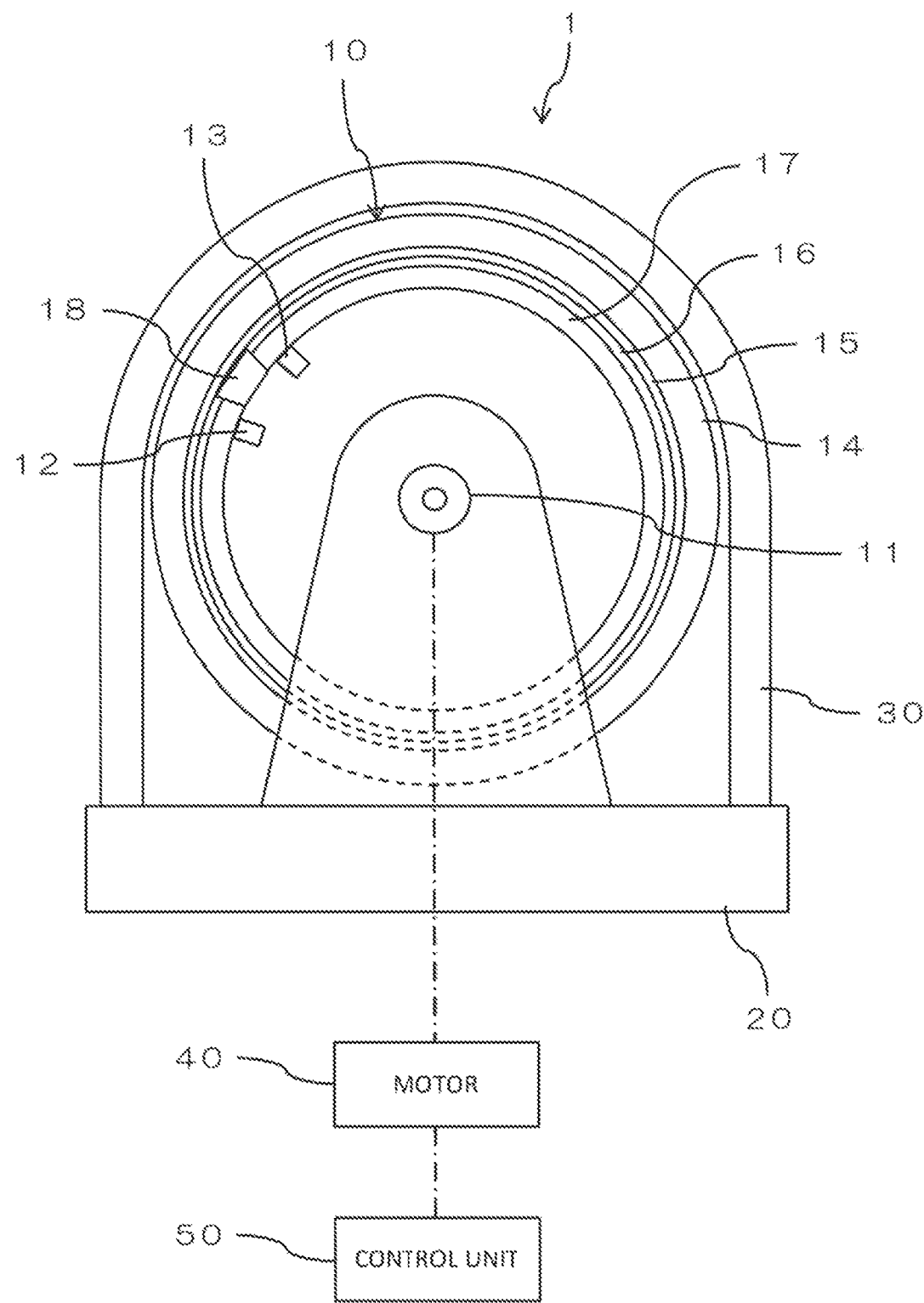
FIG. 2 is a schematic front view showing a configuration example of the centrifugal field-flow fractionation device.

FIG. 2 is a schematic front view showing a configuration example of the centrifugal field-flow fractionation device 1. The centrifugal field-flow fractionation device 1 is configured by putting together a rotation unit 10 rotating about a rotational shaft 11, a holding table 20 rotatably holding the rotational shaft 11, and a protective wall 30 for preventing an operator from coming into contact with the rotating rotation unit 10.

The rotation unit 10 is formed in a cylindrical shape, for example, and is held by the holding table 20, so that the rotational shaft 11 attached to the central portion thereof extends in the horizontal direction. For example, the protective wall 30 is a U-shaped member curved in a shape corresponding to an outer peripheral surface of the rotation unit 10, and is attached to the holding table 20 while facing the outer peripheral surface of the rotation unit 10 at a minute distance therefrom so as to cover the outer peripheral surface.

The rotational shaft 11 is formed in a hollow shape, and the liquid sample is supplied into the rotational shaft 11 from one end of the rotational shaft 11, for example. The rotation unit 10 is provided with an introduction unit 12 into which the liquid sample to be classified is introduced, and a discharge unit 13 from which the classified liquid sample is discharged. The introduction unit 12 and the discharge unit 13 each communicate with the inside of the rotational shaft 11 through piping (not shown). As a result, the liquid sample supplied into the rotational shaft 11 is introduced into the rotation unit 10 from the introduction unit 12 through piping, and after particles in the sample liquid are classified in the rotation unit 10, the particles are led to the rotational shaft 11 from the discharge unit 13 through piping and sent to the detector 6.

A motor 40, which is an example of a rotary actuator, is connected to the rotational shaft 11. By driving the motor 40, the rotation unit 10 can be rotated to apply a centrifugal force to the liquid sample in the rotation unit 10. The driving of the motor 40 is controlled by a controller 50 including a CPU (central processing unit), for example. Note, however, that the rotation unit 10 can also be rotated using a rotary actuator other than the motor 40.

Figure 3:
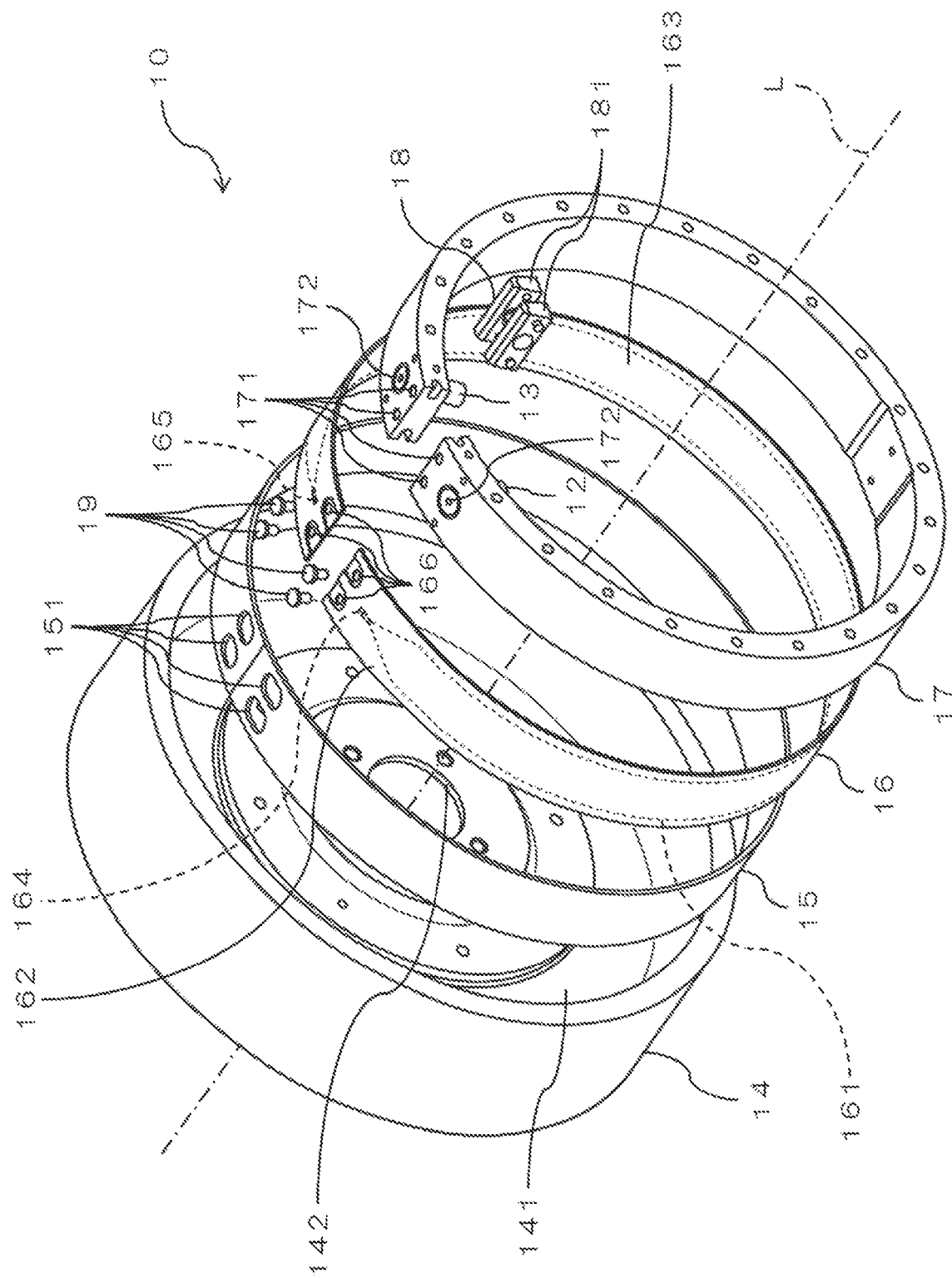
FIG. 3 is an exploded perspective view showing a configuration example of a rotation unit.

FIG. 3 is an exploded perspective view showing a configuration example of the rotation unit 10. The rotation unit 10 is configured as a cylindrical member as a whole by putting together a rotor 14, a spacer 15, a channel member 16, a fixing member 17, and a wedge-shaped member 18, and other parts, for example.

The rotor 14 is an annular member, and has one end face closed by an end face wall 141. The end face wall 141 is formed in a disk shape, and an insertion hole 142 for inserting the rotational shaft 11 is formed in a central portion of the end face wall 141. By inserting the rotational shaft 11 into the insertion hole 142 and fixing the rotational shaft 11 to the end face wall 141, the rotor 14 can be rotated about a rotation axis L coaxial with the rotational shaft 11 as the rotational shaft 11 rotates.

The spacer 15, the channel member 16, the fixing member 17, and the wedge-shaped member 18 are accommodated in a space on the inner side (rotation axis L side) of the rotor 14. Each of the spacer 15, the channel member 16, and the fixing member 17 is an elongated member curved in an arc shape, and the parts are stacked and fixed in this order along an inner peripheral surface of the rotor 14. The radius of curvature of the spacer 15, the channel member 16, and the fixing member 17 is approximately 50 to 200 mm, for example.

The channel member 16 is a thin plate having a thickness of 1 mm or less, for example, and is formed in a C shape where opposite ends in the circumferential direction are spaced apart and face each other. A channel 161 extending in the circumferential direction is formed inside the channel member 16. That is, the channel member 16 has an arc-shaped outer peripheral surface 162 formed on the rotor 14 side, and an arc-shaped inner peripheral surface 163 formed on the rotation axis L side. The channel 161 is formed between the outer peripheral surface 162 and the inner peripheral surface 163.

An inlet 164 in which the liquid sample flows into the channel 161 is formed at one circumferential end of the inner peripheral surface 163 of the channel member 16. On the other hand, an outlet 165 in which the liquid sample flows out from the channel 161 is formed at the other circumferential end of the inner peripheral surface 163 of the channel member 16. Accordingly, the liquid sample flowing into the channel 161 from the inlet 164 flows through the channel 161 from one end to the other end along the circumferential direction, and flows out from the outlet 165.

When classifying the particles in the liquid sample, first, the rotation unit 10 is rotated by the drive of the motor 40, and the rotation speed of the rotation unit 10 is gradually increased. Then, when the rotation speed of the rotation unit 10 reaches a certain value, the liquid sample is injected from the inlet 164 with the number of revolutions maintained.

After the liquid sample is injected into the channel 161 for a certain period of time, the supply of the liquid sample is stopped by switching the rotary valve 4. Continuous rotation of the rotation unit 10 in this state causes centrifugal sedimentation of the particles in the liquid sample in the channel 161. Thereafter, the supply of the liquid sample is resumed by switching the rotary valve 4, and the rotation speed of the rotation unit 10 is gradually reduced after a certain period of time.

As a result, the particles in the liquid sample are sent to the downstream side with the flow of the liquid sample in the channel 161 in ascending order of size and specific gravity, and sequentially flow out from the outlet 165. As described above, particles in the liquid sample in the channel 161 are classified by centrifugal force, and flow out from the outlet 165 at different timings depending on the size and specific gravity to be sent to the detector 6.

The fixing member 17 is a member having a thickness larger than that of the channel member 16, and has a thickness of approximately 10 mm, for example. As in the case of the channel member 16, the fixing member 17 is formed in a C shape where opposite ends in the circumferential direction are spaced apart and face each other. The circumferential length of the fixing member 17 is substantially the same as the circumferential length of the channel member 16. The fixing member 17 is provided along the inner peripheral surface 163 of the channel member 16 on the inner side (rotation axis L side) of the channel member 16.

Multiple screw holes 171 for screwing in a bolt 19, which is an example of a locking tool, are formed at opposite ends in the circumferential direction of the fixing member 17. Multiple insertion holes 166 are formed in positions facing the screw holes 171 of the fixing member 17 at opposite ends in the circumferential direction of the channel member 16. Thus, the channel member 16 can be attached to the fixing member 17 by inserting the bolt 19 into each insertion hole 166 from the outside and screwing it into each screw hole 171. Note, however, that the locking tool is not limited to the bolt 19, but may be another member such as a pin.

Further, through holes 172 are formed in positions facing the inlet 164 and the outlet 165 formed on the inner peripheral surface 163 of the channel member 16 at opposite ends in the circumferential direction of the fixing member 17. The introduction unit 12 and the discharge unit 13 are attached to the inner peripheral surface of the fixing member 17 so as to communicate with the through holes 172. Accordingly, the liquid sample introduced from the introduction unit 12 flows into the channel 161 from the inlet 164 through one through hole 172 and circulates in the channel 161 in the circumferential direction, and is then discharged from the outlet 165 through the other through hole 172 and the discharge unit 13.

The channel 161 in the channel member 16 is set to different heights depending on the type of carrier fluid, the condition of analysis, and the like. Hence, the channel member 16 is formed to have a different thickness depending on the height of the channel 161, and the optimal channel member 16 is selected from among multiple types of channel members 16 to be attached to the fixing member 17.

The fixing member 17 to which the channel member 16 is attached as described above is inserted into a space on the inner side of the rotor 14, and is fixed along the inner peripheral surface of the rotor 14 so as to sandwich the channel member 16 with the rotor 14. At this time, by attaching the wedge-shaped member 18 between opposite ends of the C-shaped fixing member 17, a force is applied in a direction of spreading the opposite ends apart.

As a result, the C-shaped fixing member 17 is strongly pressed toward the inner peripheral surface of the rotor 14, and the channel member 16 is pressed toward and fixed to the rotor 14. When classifying particles in the liquid sample, the rotor 14 is rotated at high speed, which increases the pressure inside the channel 161 (e.g., approximately 1 MPa) and increases the pressure difference between the inside and outside of the channel 161. By sandwiching the channel member 16 between the fixing member 17 and the rotor 14, it is possible to prevent deformation of the outer peripheral surface 162 and the inner peripheral surface 163 of the channel member 16 to the opposite side of the channel 161, the deformation being caused by the pressure difference.

In the embodiment, the spacer 15 is sandwiched between the channel member 16 and the rotor 14. While the material of the spacer 15 is not particularly limited, the spacer 15 is made of a resin such as PET (polyethylene terephthalate) or a metal, for example. The spacer 15 is formed slightly longer than the channel member 16, and has long holes 151 formed at opposite ends in the circumferential direction in positions facing the insertion holes 166 of the channel member 16.

Heads of the bolts 19 inserted into the insertion holes 166 of the channel member 16 are accommodated in the long holes 151 of the spacer 15. Each long hole 151 extends in the circumferential direction. Hence, when the opposite ends of the fixing member 17 are separated from each other by the wedge-shaped member 18 and the fixing member 17 is strongly pressed toward the inner peripheral surface of the rotor 14 with the head of each bolt 19 accommodated in each long hole 151, the spacer 15 and the channel member 16 are sandwiched between the fixing member 17 and the rotor 14 while the head of each bolt 19 slides in the circumferential direction in each long hole 151.

The spacer 15 is a thin plate having a thickness of 1 mm or less, for example, and plates having different thicknesses are selected depending on the thickness of the channel member 16. That is, the spacer 15 having the optimum thickness is selected so that the total value of the thickness of the spacer 15 and the thickness of the channel member 16 is substantially constant. The spacer 15 also has a function of preventing damage to the inner peripheral surface of the rotor 14. Note, however, that the spacer 15 may be omitted.

Figure 4:
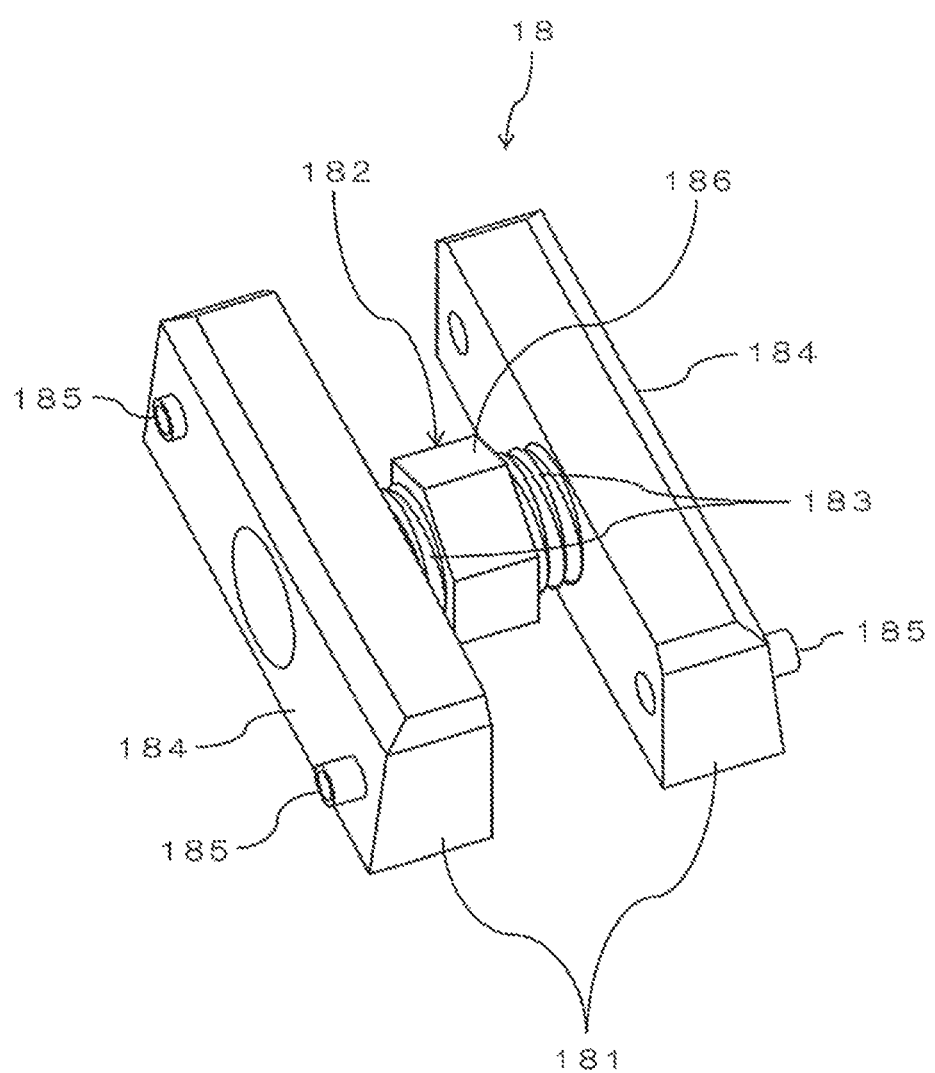
FIG. 4 is a perspective view showing a configuration example of a wedge-shaped member.

FIG. 4 is a perspective view showing a configuration example of the wedge-shaped member 18. The wedge-shaped member 18 includes a pair of nut portions 181, and one bolt portion 182, for example. The bolt portion 182 has two shaft portions 183 extending in opposite directions along the axial direction, one shaft portion 183 has a right-handed screw and the other shaft portion 183 has a left-handed screw.

More specifically, the bolt portion 182 is configured such that a polygonal head 186 and the pair of shaft portions 183 extending in opposite directions on the same axis as the head 186 are formed integrally. The threads formed on the pair of shaft portions 183 are formed in spiral shapes extending in opposite directions toward the tip end side from the head 186 side. When the bolt portion 182 is rotated, the head 186 is rotated by fitting a tool thereto, whereby the pair of shaft portions 183 can be rotated in the same direction around the axis.

The pair of nut portions 181 face each other with the bolt portion 182 interposed therebetween. One shaft portion 183 of the bolt portion 182 is screwed into one nut portion 181, and the other shaft portion 183 of the bolt portion 182 is screwed into the other nut portion 181. Hence, when the bolt portion 182 is rotated in one direction, each of the pair of shaft portions 183 is tightened with respect to a corresponding one of the pair of nut portions 181. This brings the pair of nut portions 181 closer to each other. Meanwhile, when the bolt portion 182 is rotated in the reverse direction, each of the pair of shaft portions 183 is loosened with respect to a corresponding one of the pair of nut portions 181. This separates the pair of nut portions 181 from each other. As described above, the pair of nut portions 181 form a pair of displacement portions that are displaced with rotation of the bolt portion 182.

The wedge-shaped member 18 is provided between the opposite ends of the C-shaped fixing member 17, and a surface of each nut portion 181 opposite to the bolt portion 182 side forms a contact surface 184 that comes into contact with a corresponding one of opposite end faces of the fixing member 17. When the bolt portion 182 is rotated, the relative displacement of the pair of nut portions 181 described above changes the distance between the pair of contact surfaces 184 formed on the nut portions 181. Thus, by rotating the bolt portion 182 with the contact surfaces 184 in contact with opposite end faces of the fixing member 17 to expand and reduce the distance between the opposite ends of the fixing member 17, it is possible to adjust the pressing force of the fixing member 17 toward the rotor 14, or to attach and detach the fixing member 17.

At this time, the bolt portion 182 forms an adjustment mechanism that adjusts the distance between the pair of contact surfaces 184. Note, however, that the adjustment mechanism is not limited to the configuration using the bolt portion 182 having the pair of shaft portions 183, and may be a configuration using a bolt portion having one shaft portion, for example, as long as the configuration allows adjustment of the distance between the pair of contact surfaces 184. In this case, the distance between the pair of contact surfaces 184 may be changed with rotation of the bolt portion by interposing a transmission member such as a gear, for example.

The contact surfaces 184 of the nut portions 181 include tapered surfaces that gradually taper down toward the outer side (rotor 14 side). That is, the pair of contact surfaces 184 are formed such that the distance between the contact surfaces 184 gradually shortens as the contact surfaces 184 come close to the rotor 14. The opposite end faces of the fixing member 17 in contact with the contact surfaces 184 also include tapered surfaces where the end faces gradually come closer to each other toward the outer side (rotor 14 side).

Hence, when the distance between the opposite ends of the fixing member 17 is expanded by rotating the bolt portion 182 to separate the two nut portions 181 from each other with the wedge-shaped member 18 provided between the opposite ends of the fixing member 17, the contact surfaces 184 of the nut portions 181 push the opposite end faces of the fixing member 17 upward toward the outer side (rotor 14 side). As a result, the fixing member 17 can be pressed toward the rotor 14 with a larger pressing force.

One or multiple projections 185 are formed on the contact surface 184 of each nut portion 181, and the projection 185 engages with a recess (not shown) formed on a corresponding one of the opposite end faces of the fixing member 17. As a result, the wedge-shaped member 18 is positioned between the opposite ends of the fixing member 17. That is, the projection 185 formed on each of the pair of contact surfaces 184 forms a positioning portion for positioning the wedge-shaped member 18 between the opposite ends of the fixing member 17.

Note, however, that the recess may be formed on the wedge-shaped member 18 side, and the projection may be formed on the fixing member 17 side. Further, the positioning portion for positioning the wedge-shaped member 18 between the opposite ends of the fixing member 17 is not limited to the combination of a projection and a recess, and any other configuration may be employed as long as it can reliably position the wedge-shaped member 18. Further, the wedge-shaped member 18 is not limited to the configuration including one pair of nut portions 181 and one bolt portion 182, and any other configuration may be employed as long as it can press and fix the fixing member 17 toward the rotor 14.

Figure 5:
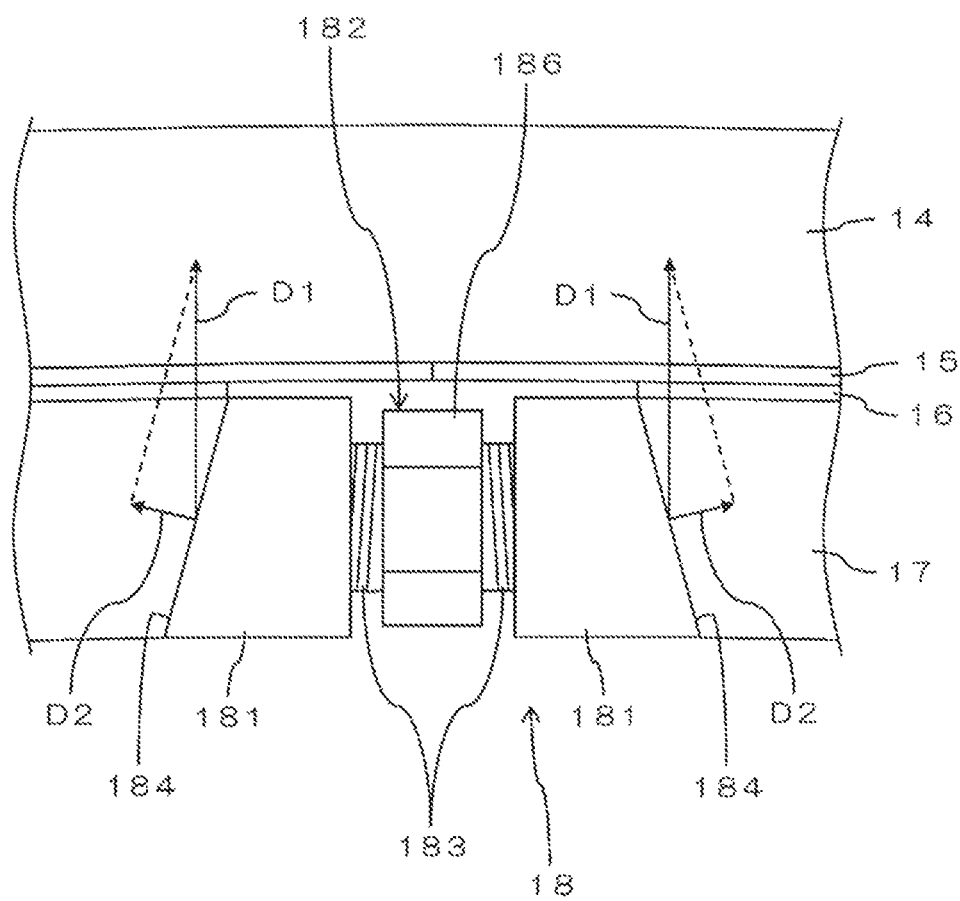
FIG. 5 is a schematic view for describing an aspect when a centrifugal force acts on the wedge-shaped member.

FIG. 5 is a schematic view for describing an aspect when a centrifugal force acts on the wedge-shaped member 18. As shown in FIG. 5, when the rotor 14 rotates, an outward (toward rotor 14 side) centrifugal force acts on the wedge-shaped member 18, and the centrifugal force causes a force to act on the opposite ends of the fixing member 17 in an arrow D1 direction from the contact surfaces 184. The pair of contact surfaces 184 are inclined at an angle of 1 to 10 degrees, more preferably 3 to 8 degrees, and still more preferably 5 to 6 degrees, for example, with respect to the direction in which the centrifugal force acts (arrow D1 direction).

The force in the arrow D1 direction acts on the opposite ends of the fixing member 17 as a force in a direction of spreading the opposite ends of the fixing member 17 apart as indicated by arrow D2. Since the centrifugal force increases with an increase in the rotation speed of the rotor 14, the force in the arrow D2 direction increases with an increase in the rotation speed of the rotor 14. In the embodiment, when particles in a liquid sample are classified (during liquid sample injection), the rotor 14 is rotated at a high rotation speed of 5000 rpm or more, and more specifically, 10000 rpm or more, for example.

As described above, in the embodiment, the pair of contact surfaces 184 of the wedge-shaped member 18 come into contact with the opposite ends of the fixing member 17 and apply force in a direction of spreading the opposite ends apart. Thus, the fixing member 17 is pressed toward the inner peripheral surface of the rotor 14. The pair of contact surfaces 184 include tapered surfaces that gradually taper down toward the rotor 14 side, so that the distance between the contact surfaces 184 gradually shortens as the contact surfaces 184 come close to the rotor 14. Hence, the larger the centrifugal force, the larger the force acting in the direction of spreading the opposite ends of the fixing member 17 apart, as indicated by arrow D2 in FIG. 5.

Accordingly, even if the rotor 14 rotates at a high rotation speed as in the embodiment and a relatively large centrifugal force acts on the wedge-shaped member 18, the pair of contact surfaces 184 of the wedge-shaped member 18 are less likely to shift to the rotor 14 side from the opposite ends of the fixing member 17. This prevents centrifugal force from weakening the force of the wedge-shaped member 18 acting in the direction of spreading the opposite ends of the fixing member 17 apart. Hence, the wedge-shaped member 18 can stably press the fixing member 17 toward the inner peripheral surface of the rotor 14.

In particular, in the embodiment, by using the bolt portion 182 as an adjustment mechanism to adjust the distance between the pair of contact surfaces 184, it is possible to adjust the force of the wedge-shaped member 18 acting in the direction of spreading the opposite ends of the fixing member 17 apart. This effectively prevents centrifugal force from weakening the force of the wedge-shaped member 18 acting in the direction of spreading the opposite ends of the fixing member 17 apart. Hence, the wedge-shaped member 18 can press the fixing member 17 even more stably toward the inner peripheral surface of the rotor 14.

Moreover, since there is no need to provide a screw hole in the rotor 14 to attach the wedge-shaped member 18, it is possible to prevent stress concentration in the rotor 14. Accordingly, the rotor 14 need not be upsized to prevent breakage of the rotor 14 caused by stress concentration, and therefore the entire device need not be upsized.

In a case where the adjustment mechanism is the bolt portion 182 as in the embodiment, the distance between the pair of contact surfaces 184 can be changed by relatively displacing the pair of nut portions 181, by simply rotating one bolt portion 182. Accordingly, it is possible to easily and appropriately adjust the force of the wedge-shaped member 18 acting in the direction of spreading the opposite ends of the fixing member 17 apart.

Further, in the embodiment, the two shaft portions 183 extending in opposite directions along the axial direction can be simultaneously rotated by simply rotating one bolt portion 182. At this time, one shaft portion 183 has a right-handed screw, and the other shaft portion 183 has a left-handed screw. Hence, the pair of nut portions 181 can be relatively displaced efficiently with rotation of the bolt portion 182. Thus, the distance between the pair of contact surfaces 184 can be easily changed only by rotating the bolt portion 182 by a small rotation amount. This improves work efficiency.

Furthermore, in the embodiment, the wedge-shaped member 18 is positioned between the opposite ends of the fixing member 17 through the projection 185 as a positioning portion. Hence, it is possible to prevent shifting of the contact position of the pair of contact surfaces 184 on the opposite ends of the fixing member 17. Accordingly, the wedge-shaped member 18 can more stably press the fixing member 17 toward the inner peripheral surface of the rotor 14. In addition, when the bolt portion 182 is rotated to change the distance between the pair of contact surfaces 184, it is possible to prevent rotation of the entire wedge-shaped member 18 with the rotation of the bolt portion 182. This improves work efficiency.

Figure 6:
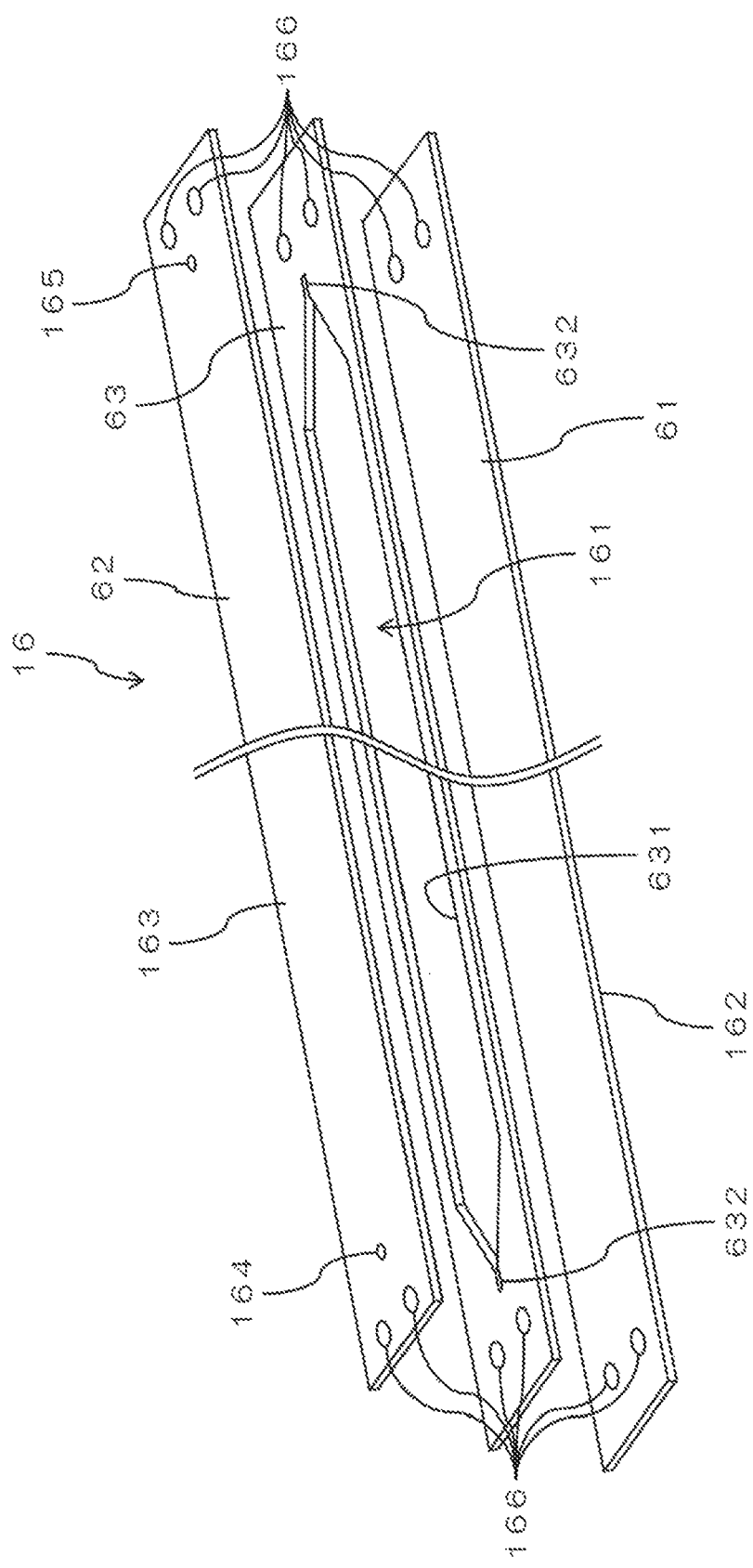
FIG. 6 is an exploded perspective view showing a configuration example of a channel member, showing a view from the inner peripheral surface side of the channel member before it is curved in an arc shape.

FIG. 6 is an exploded perspective view showing a configuration example of the channel member 16, showing a view from the inner peripheral surface 163 side of the channel member 16 before it is curved in an arc shape. The channel member 16 is formed of a three-layer laminate in which an outer surface layer 61, an inner surface layer 62, and an intermediate layer 63 are stacked on top of one another, for example. The intermediate layer 63 is provided between the outer surface layer 61 and the inner surface layer 62. Each layer 61, 62, 63 is formed of stainless steel (SUS), and has a thickness of approximately 0.25 mm, for example.

A surface of the outer surface layer 61 opposite to the intermediate layer 63 side forms the outer peripheral surface 162 of the channel member 16 when the channel member 16 is curved in an arc shape. Further, a surface of the inner surface layer 62 opposite to the intermediate layer 63 side forms the inner peripheral surface 163 of the channel member 16 when the channel member 16 is curved in an arc shape.

The intermediate layer 63 includes an opening 631 penetrating the intermediate layer 63 and extending straight in the longitudinal direction. The opening 631 can be formed by etching or electrical discharge machining, for example. Opposite ends in the longitudinal direction of the opening 631 are formed in a gradually tapered triangular shape, and each tip end is an elongated port portion 632 projecting in the longitudinal direction.

The intermediate layer 63 is sandwiched between the outer surface layer 61 and the inner surface layer 62 to close the outer and inner sides of the opening 631 (including port portion 632), so that the channel 161 is formed between the outer surface layer 61 and the inner surface layer 62. The channel member 16 integrally formed in this manner is curved in an arc shape having an inner diameter substantially the same as the outer diameter of the fixing member 17 by use of a bending roll (sheet-metal bending machine) or the like.

The inlet 164 and the outlet 165 are formed in the inner surface layer 62 at positions facing the port portions 632. Thus, when the layers 61, 62, 63 are stacked on top of one another, the inlet 164 and the outlet 165 communicate with the channel 161 through the port portions 632. Through holes are formed in positions facing each other at opposite ends in the longitudinal direction of each of the layers 61, 62, 63, and these through holes form the insertion holes 166 for inserting the bolts 19.

In the embodiment, multiple layers including the outer surface layer 61, the inner surface layer 62, and the intermediate layer 63 are joined to one another to form a laminate. That is, the outer surface layer 61 is joined to the intermediate layer 63, and the inner surface layer 62 is joined to the intermediate layer 63. Thus, the outer peripheral surface 162 and the inner peripheral surface 163 of the channel member 16 are formed integrally, and the channel member 16 is configured as one hollow member with the channel 161 formed therein.

This improves the pressure resistance performance of the channel member 16, and generation of a gap in the channel 161 can be prevented even with high pressure inside the channel 161 or at a high rotation speed of the rotor 14. Moreover, since the sealing property is not degraded over time, the liquid sample is less likely to leak out of the channel 161. In addition, since the channel member 16 can be handled as one member, it is possible to attach and detach the channel member 16 at once without having to care not to smear the inside of the channel 161, for example.

Further, in the embodiment, the fixing member 17 can press and firmly fix the channel member 16 to the rotor 14. The channel member 16 has a liquid-tight structure as a single member having the channel 161 formed therein. For this reason, the pressing force of the fixing member 17 on the channel member 16 does not have to be as large as in conventional techniques. As a result, the sealing property is not degraded by deformation of the channel member 16, and therefore the liquid sample is less likely to leak out of the channel 161.

In particular, in the embodiment, multiple layers including the outer surface layer 61, the inner surface layer 62, and the intermediate layer 63 are joined to one another to form the liquid-tight channel member 16 in which the channel 161 is formed. By thus forming the channel 161 by combining multiple layers, the shape of the channel 161 can be designed more freely.

The layers 61, 62, 63 can be joined together by diffusion bonding, for example. Diffusion bonding is a method in which the layers 61, 62, 63 are brought into close contact with one another and pressurized while being heated at a temperature equal to or lower than the melting point of the layers 61, 62, 63, to join them together by utilizing diffusion of atoms occurring between the joint surfaces. By using diffusion bonding described above, the layers 61, 62, 63 can be joined firmly to each other by bonding of atoms.

When the layers 61, 62, 63 are joined to each other, if the layers 61, 62, 63 are to be joined after they are deformed into an arc shape, the shapes of the layers 61, 62, 63 will vary, making it difficult to join the layers 61, 62, 63 neatly. Hence, it is preferable that the layers 61, 62, 63 first be joined together in the straight state, and then be deformed into an arc shape. Even in such a case, if the layers 61, 62, 63 are firmly joined by diffusion bonding, the layers 61, 62, 63 do not easily come off when deformed into an arc shape. Hence, the liquid sample is less likely to leak out of the channel 161.

In addition, when diffusion bonding is used, no irregular shape is formed in the joint portion. Hence, the joint portion does not affect the flow of the liquid sample in the channel 161, and degradation of the classification performance can be prevented. Note, however, that the method of joining the layers 61, 62, 63 is not limited to diffusion bonding, but may be performed by other methods such as brazing, welding, or heat sealing.

In the embodiment, since the multiple layers 61, 62, 63 forming the wall surface of the channel 161 are formed of the same kind of material (e.g., stainless steel), it is easy to predict what influence the state of the wall surface of the channel 161 has on the classification performance. Additionally, the layers 61, 62, 63 formed of the same kind of material thermally deform in the same manner at the time of joining under high temperature as in the case of diffusion joining, for example. Hence, the layers 61, 62, 63 can be joined easily, and are less likely to come off even after they have cooled down after joining. Accordingly, the liquid sample is even less likely to leak out of the channel 161.

However, the material of the layers 61, 62, 63 is not limited to stainless steel, and may be another metal or a material other than metal. When the layers 61, 62, 63 are formed of metal, the layers 61, 62, 63 may be joined by diffusion bonding, brazing, or welding, for example. Meanwhile, when the layers 61, 62, 63 are formed of resin, the layers 61, 62, 63 may be joined by heat sealing, for example.

Figure 7:
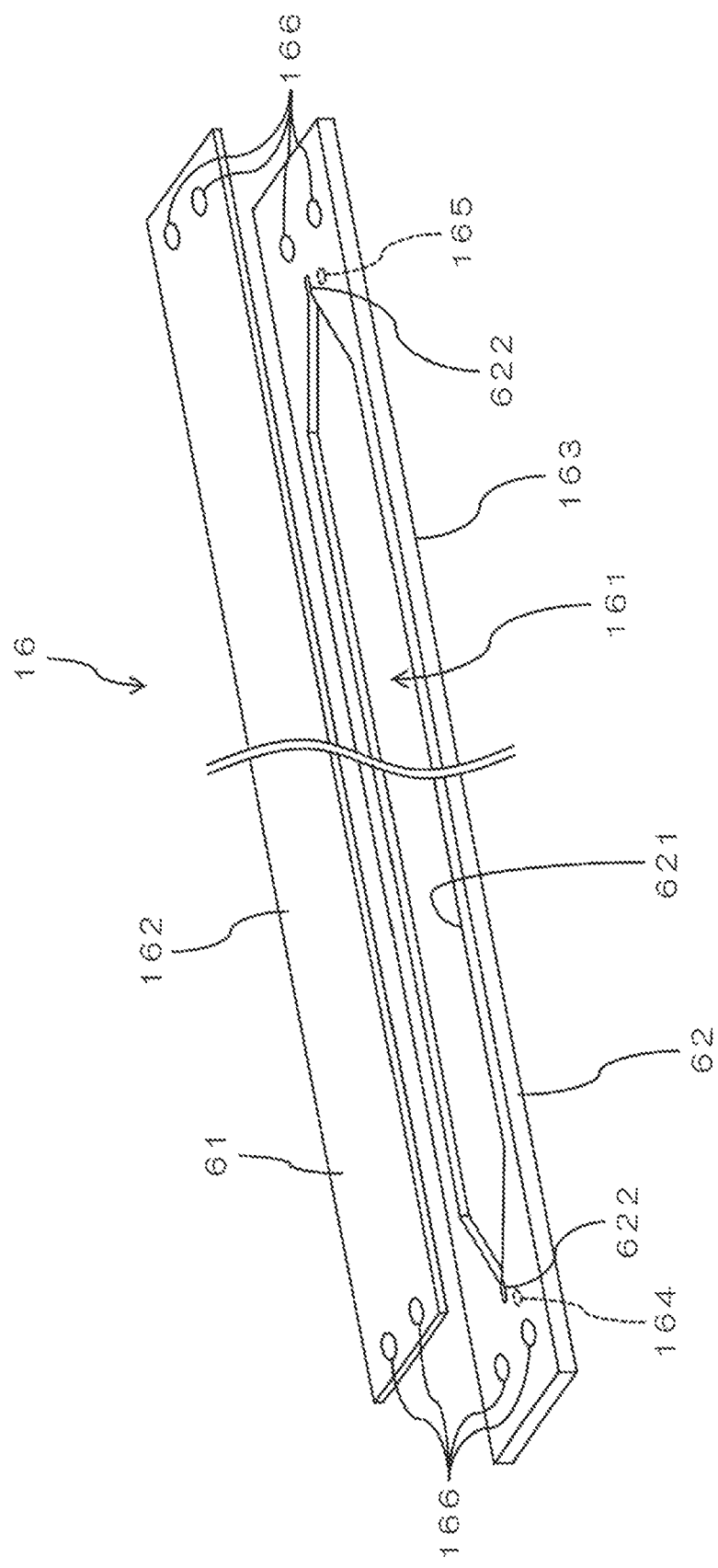
FIG. 7 is an exploded perspective view showing a first modification of the channel member, showing an oblique view from the outer peripheral surface side of the channel member before it is curved in an arc shape.

FIG. 7 is an exploded perspective view showing a first modification of a channel member 16, showing an oblique view from an outer peripheral surface 162 side of the channel member 16 before it is curved in an arc shape. The channel member 16 in this example is formed of a two-layer laminate in which an outer surface layer 61 and an inner surface layer 62 are stacked on top of one another, for example. Each layer 61, 62 is formed of stainless steel (SUS), and the outer surface layer 61 has a thickness of approximately 0.25 mm, while the inner surface layer 62 has a thickness of approximately 0.5 mm, for example.

A surface of the outer surface layer 61 opposite to the inner surface layer 62 side forms the outer peripheral surface 162 of the channel member 16 when the channel member 16 is curved in an arc shape. Further, a surface of the inner surface layer 62 opposite to the outer surface layer 61 side forms an inner peripheral surface 163 of the channel member 16 when the channel member 16 is curved in an arc shape.

The inner surface layer 62 includes a recess 621 extending straight in the longitudinal direction. The recess 621 is dug in the surface of the inner surface layer 62 by half etching, for example, and does not penetrate the inner surface layer 62. The recess 621 has a depth of about half the thickness of the inner surface layer 62 (e.g., approximately 0.25 mm). Opposite ends in the longitudinal direction of the recess 621 are formed in a gradually tapered triangular shape, and each tip end is an elongated port portion 622 projecting in the longitudinal direction.

The outer surface layer 61 and the inner surface layer 62 are joined with each other, so that the outer surface layer 61 closes the recess 621 (including port portions 622) and a channel 161 is formed between the outer surface layer 61 and the inner surface layer 62. The channel member 16 integrally formed in this manner is curved in an arc shape having an inner diameter substantially the same as the outer diameter of the fixing member 17 by use of a bending roll or the like.

At the tip end of each port portion 622, an inlet 164 and an outlet 165 are formed so as to penetrate the inner surface layer 62. Thus, when the layers 61, 62 are stacked on top of one another, the inlet 164 and the outlet 165 communicate with the channel 161 through the port portions 622. Through holes are formed in positions facing each other at opposite ends in the longitudinal direction of each of the layers 61, 62, and these through holes form insertion holes 166 for inserting bolts 19.

Note, however, that the present invention is not limited to the configuration including the recess 621 formed in the inner surface layer 62, and the recess 621 may be formed in the outer surface layer 61 instead. In this case, the inner surface layer 62 may be configured to include only the inlet 164 and the outlet 165 formed in positions facing the port portions 622 of the recess 621 formed in the outer surface layer 61.

As in the example of FIG. 7, the channel member 16 is not limited to the three-layer structure, but may be a two-layer structure. Moreover, the channel member 16 may be formed of a laminate including four or more layers. That is, the intermediate layer 63 provided between the outer surface layer 61 and the inner surface layer 62 may be formed of multiple layers instead of one layer.

Figure 8:
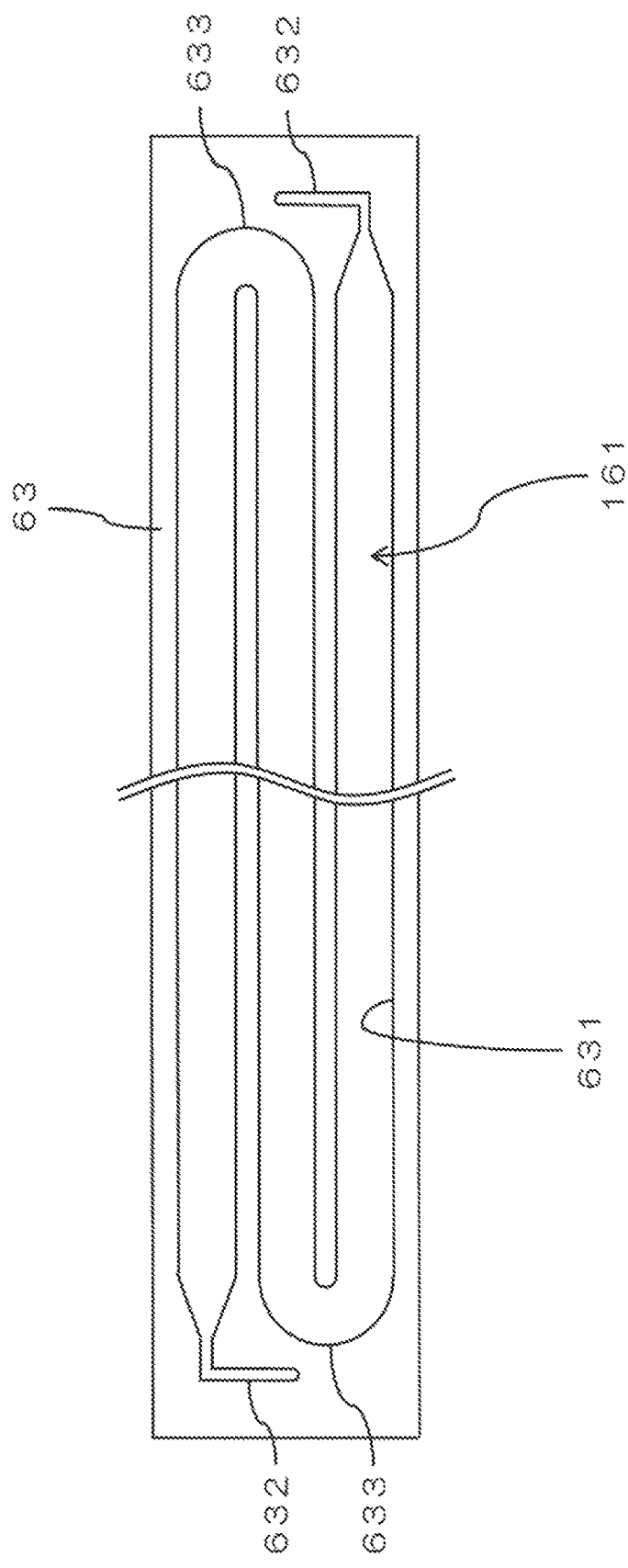
FIG. 8 is a diagram for describing a second modification of the channel member, showing a configuration example of an intermediate layer in plan view.

FIG. 8 is a diagram for describing a second modification of a channel member 16, showing a configuration example of an intermediate layer 63 in plan view. In this example, an opening 631 does not extend straight in the longitudinal direction, but a curved portion 633 is formed in a part of the opening 631 to change the flow direction of a liquid sample flowing in a channel 161.

Specifically, the curved portion 633 is placed to fold back the channel 161, so that the flow direction of the liquid sample changes by 180 degrees in a plane parallel to an outer peripheral surface 162 and an inner peripheral surface 163 (in a plane parallel to intermediate layer 63). Each of port portions 632 provided at opposite ends of the opening 631 is elongated to a position where the tip end thereof faces an inlet 164 or an outlet 165.

As a result, the flow direction of the liquid sample can be changed by the curved portion 633 to form a long channel 161. This can improve the classification performance. In addition, when a complex channel 161 such as that including the curved portion 633 is to be formed by a laminated structure, it is extremely difficult to handle each layer (intermediate layer 63 in this example) individually. However, by forming the channel member 16 as one member including integrally formed layers, attachment and detachment of the channel member 16 becomes extremely easy.

While two curved portions 633 are provided in this example, three or more curved portions 633 may be provided instead. Additionally, the curved portion 633 is not limited to the shape that changes the flow direction of the liquid sample by 180 degrees, and may have a shape that changes the flow direction of the liquid sample at another angle. Furthermore, the same effect can be obtained by changing the flow direction of the liquid sample by a bent portion instead of the curved portion 633.

In FIG. 8, the configuration in which the opening 631 having the curved portion 633 is formed in the intermediate layer 63 of the three-layer channel member 16 has been described. However, the present invention is not limited to such a configuration, and may be a configuration in which a recess 621 having a curved portion or a bent portion is formed in an outer surface layer 61 or an inner surface layer 62 of a two-layer channel member 16 as shown in FIG. 7, for example. Moreover, an opening 631 having a curved portion or a bent portion may be formed in several intermediate layers 63 in a channel member 16 formed of a laminate of four or more layers.

Figure 9:
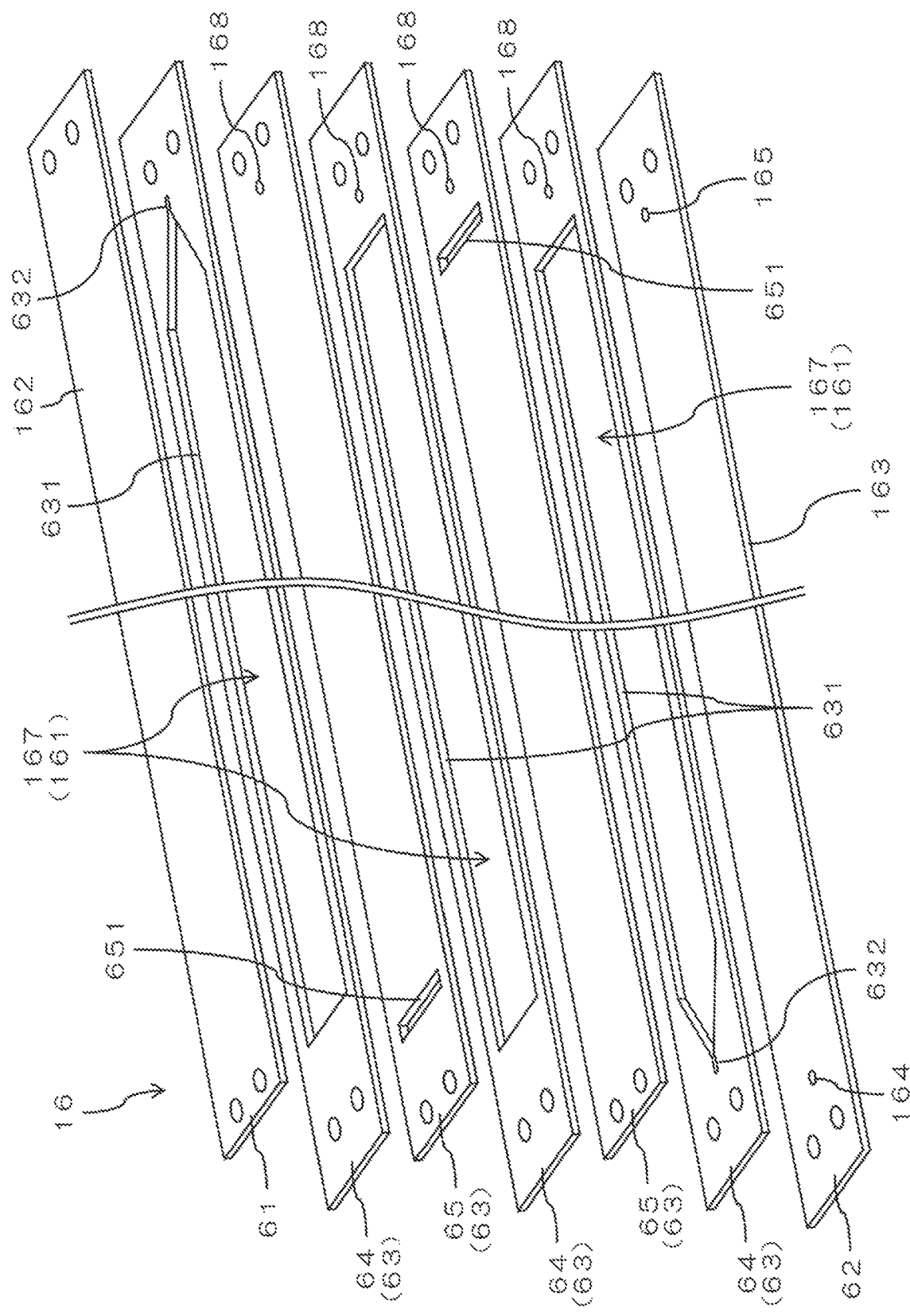
FIG. 9 is an exploded perspective view showing a third modification of the channel member, showing an oblique view from the outer peripheral surface side of the channel member before it is curved in an arc shaped.

FIG. 9 is an exploded perspective view showing a third modification of a channel member 16, showing an oblique view from an outer peripheral surface 162 side of the channel member 16 before it is curved in an arc shape. The channel member 16 in this example is a laminate in which an intermediate layer 63 formed of multiple layers is laminated between an outer surface layer 61 and an inner surface layer 62, for example. In this example, the intermediate layer 63 includes three channel layers 64 and two separation layers 65 provided between the channel layers 64. The channel layer 64 and the separation layer 65 are alternately stacked on top of one another. Each layer 61, 62, 64, 65 is formed of stainless steel (SUS), and has a thickness of approximately 0.25 mm, for example.

A surface of the outer surface layer 61 opposite to the intermediate layer 63 side forms the outer peripheral surface 162 of the channel member 16 when the channel member 16 is curved in an arc shape. Further, a surface of the inner surface layer 62 opposite to the intermediate layer 63 side forms the inner peripheral surface 163 of the channel member 16 when the channel member 16 is curved in an arc shape.

Each channel layer 64 forming the intermediate layer 63 includes an opening 631 penetrating the channel layer 64 and extending straight in the longitudinal direction. The opening 631 can be formed by etching or electrical discharge machining, for example. One end in the longitudinal direction of the opening 631 formed in the channel layer 64 closest to the outer surface layer 61 is formed in a gradually tapered triangular shape, and its tip end is an elongated port portion 632 projecting in the longitudinal direction. In addition, the opening 631 formed in the channel layer 64 closest to the inner surface layer 62, too, has an end, which is on the opposite side of the port portion 632 of the channel layer 64 closest to the outer surface layer 61, formed in a gradually tapered triangular shape whose tip end is an elongated port portion 632 projecting in the longitudinal direction.

When the layers 61, 62, 64, 65 are stacked on top of one another, the separation layer 65 provided between the channel layers 64 separates the openings 631 formed in the channel layers 64. A through hole 651 is formed in each separation layer 65 in a position facing an end of the opening 631. Specifically, the through hole 651 formed in the separation layer 65 on the outer surface layer 61 side faces an end on the opposite side of the port portion 632 of the opening 631 formed in the channel layer 64 closest to the outer surface layer 61. The through hole 651 formed in the separation layer 65 on the inner surface layer 62 side faces an end on the opposite side of the port portion 632 of the opening 631 formed in the channel layer 64 closest to the inner surface layer 62.

Thus, multiple divided paths 167 formed of the openings 631 formed in the channel layers 64 communicate with one another through the through holes 651 formed in the separation layers 65, and a continuous channel 161 is formed. The channel member 16 integrally formed in this manner is curved in an arc shape having an inner diameter substantially the same as the outer diameter of the fixing member 17 by use of a bending roll or the like. When the channel member 16 is curved, the multiple divided paths 167 extending in an arc shape are aligned in the radial direction (the stacking direction of layers 61, 62, 64, 65).

The inlet 164 and the outlet 165 are formed in the inner surface layer 62 at positions facing the port portions 632. In each of the intermediate layers 63 other than the channel layer 64 closest to the outer surface layer 61, a small hole 168 is formed in a position facing the port portion 632 formed in the channel layer 64 closest to the outer surface layer 61. The small holes 168 have the same diameter as the outlet 165, for example, and when the layers 61, 62, 64, 65 are stacked on top of one another, the port portion 632 formed in the channel layer 64 closest to the outer surface layer 61 communicates with the outlet 165 through the small holes 168. Thus, when the layers 61, 62, 64, 65 are stacked on top of one another, the inlet 164 and the outlet 165 communicate with the channel 161 through the port portions 632.

In this example, the multiple divided paths 167 aligned in the radial direction are connected to form the long channel 161. This can improve the classification performance. As compared to the configuration in which the channel 161 has the curved portion 633 as in FIG. 8, in the above example, the flow velocity of the liquid sample in the channel 161 is less likely to vary. Hence, the classification performance can be improved more effectively.

Note, however, that the present invention is not limited to the configuration in which the port portion 632 formed in the channel layer 64 closest to the inner surface layer 62 communicates with the inlet 164, and the port portion 632 formed in the channel layer 64 closest to the outer surface layer 61 communicates with the outlet 165. Instead, the port portion 632 formed in the channel layer 64 closest to the inner surface layer 62 may communicate with the outlet 165, and the port portion 632 formed in the channel layer 64 closest to the outer surface layer 61 may communicate with the inlet 164.

Figure 10:
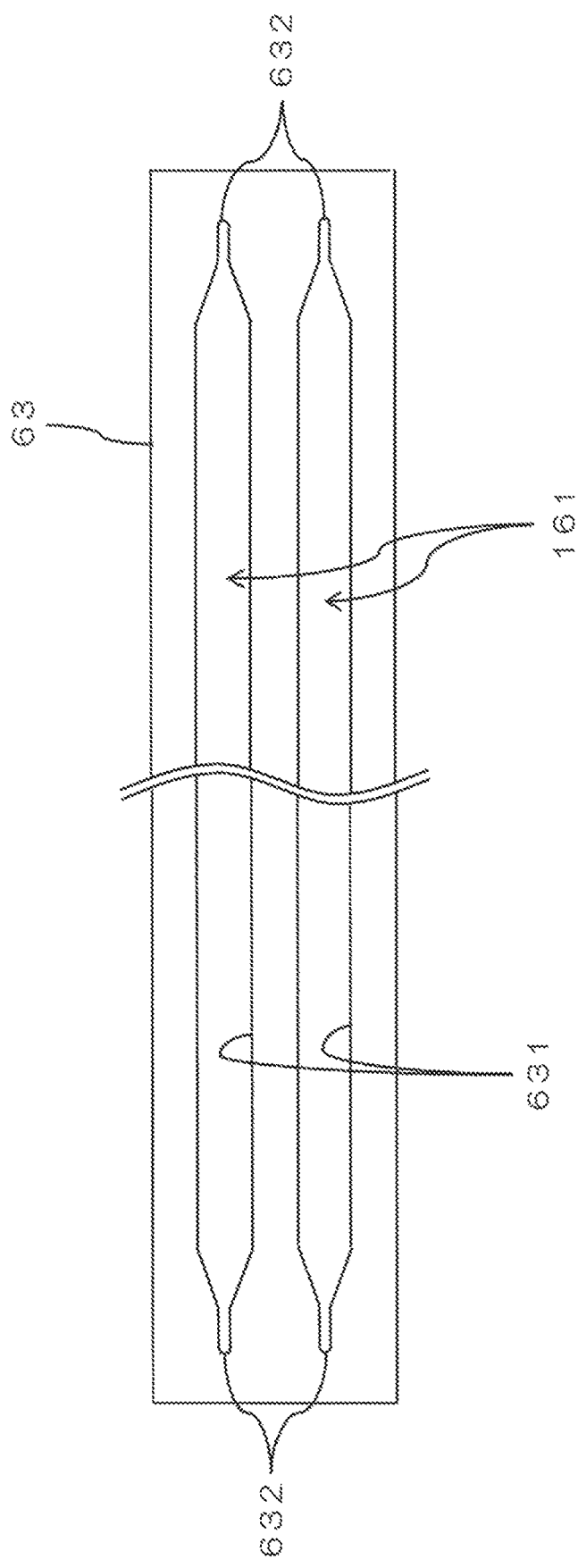
FIG. 10 is a diagram for describing a fourth modification of the channel member, showing a configuration example of an intermediate layer in plan view.

FIG. 10 is a diagram for describing a fourth modification of a channel member 16, showing a configuration example of an intermediate layer 63 in plan view. In this example, the intermediate layer 63 includes, not one but two openings 631 extending straight in the longitudinal direction of the intermediate layer 63. The openings 631 are formed in the same shape so as to extend in parallel to each other, and port portions 632 are provided at the opposite ends of the openings 631.

An inlet 164 is formed in an inner surface layer 62 at a position facing the port portion 632 formed at one end of each opening 631, and an outlet 165 is formed in the inner surface layer 62 at a position facing the port portion 632 formed at the other end of each opening 631. Hence, when an outer surface layer 61, the inner surface layer 62, and the intermediate layer 63 are stacked on top of one another, multiple channels 161 are formed in a plane parallel to an outer peripheral surface 162 and an inner peripheral surface 163 (in a plane parallel to intermediate layer 63), while the inlet 164 and the outlet 165 are formed in the inner surface layer 62 in association with each channel 161. Multiple inlets 164 and outlets 165 are formed in the inner surface layer 62, and different introduction units 12 communicate with the inlets 164, while different discharge units 13 communicate with the outlets 165.

In this example, different liquid samples can be introduced individually into the multiple channels 161. Hence, by switching the channel 161 to be used as necessary, particles in the liquid sample can be classified using different channels 161, without attaching and detaching the channel member 16. In addition, by using multiple channels 161 at the same time, work efficiency can be improved.

The number of channels 161 is not limited to two, and may be three or more. Moreover, the channels 161 do not necessarily have to be of the same shape, and may be formed in different shapes (e.g., different lengths or different heights). Furthermore, as in an example in FIG. 10, the channel member 16 formed of a two-layer laminate as in FIG. 7 or the channel member 16 formed of a laminate including four or more layers as in FIG. 9 can also be configured to have multiple channels 161 in a plane parallel to the outer peripheral surface 162 and the inner peripheral surface 163.

In the above embodiments, configurations have been described in which the integral channel member 16 is formed by joining together multiple layers, and then the channel member 16 is curved in an arc shape. However, the present invention is not limited to such a configuration, and the multiple layers may be individually curved in an arc shape, and then the layers may be joined together to form an integral channel member 16.

The channel member 16 is not limited to the configuration in which multiple layers are stacked on top of one another, and may be formed as one member made of resin or the like by blow molding, for example. Further, the channel member 16 is not limited to the configuration in which multiple layers are joined to each other, and may be configured of a laminate in which multiple layers are simply superimposed on one another.

DESCRIPTION OF REFERENCE SIGNS 1 centrifugal field-flow fractionation device
10 rotation unit
11 rotational shaft
12 introduction unit
13 discharge unit
14 rotor
15 spacer
16 channel member
17 fixing member
18 wedge-shaped member
61 outer surface layer
62 inner surface layer
63 intermediate layer
64 channel layer
65 separation layer
161 channel
162 outer peripheral surface
163 inner peripheral surface
164 inlet
165 outlet
181 nut portion
182 bolt portion
183 shaft portion
184 contact surface
185 projection
186 head

The invention claimed is:
1. A centrifugal field-flow fractionation device comprising:
a rotor having an annular shape and configured to rotate about a rotation axis;
a channel member
having an arc shape,
provided along an inner peripheral surface of the rotor,
having an outer peripheral surface having an arc shape and formed on a side of the rotor, and an inner peripheral surface having an arc shape and formed on a side of the rotation axis,
including a channel for a liquid sample, and
having an inlet in which the liquid sample flows into the channel, and an outlet in which the liquid sample flows out from the channel;

a fixing member having an arc shape and provided along the inner peripheral surface of the channel member on the side of the rotation axis with respect to the channel member;

a wedge-shaped member attached between opposite ends of the fixing member and configured to apply a force in a direction of spreading the opposite ends apart, so that the fixing member is pressed toward the inner peripheral surface of the rotor; and a rotary actuator configured to rotate the rotor to classify particles in a liquid sample in the channel by centrifugal force, wherein the wedge-shaped member has a pair of contact surfaces that come into contact with the opposite ends of the fixing member, and the pair of contact surfaces include tapered surfaces that gradually taper down toward the rotor, so that a distance between the contact surfaces gradually shortens as the contact surfaces come close to the rotor.

2. The centrifugal field-flow fractionation device according to claim 1, wherein the wedge-shaped member has an adjustment mechanism configured to adjust the distance between the pair of contact surfaces.

3. The centrifugal field-flow fractionation device according to claim 2, wherein the wedge-shaped member has a pair of displacement portions respectively provided with the pair of contact surfaces, and one bolt portion, and relative displacement of the pair of displacement portions caused by rotation of the bolt portion changes the distance between the pair of contact surfaces.

4. The centrifugal field-flow fractionation device according to claim 3, wherein the bolt portion has two shaft portions extending in opposite directions along an axial direction, one of the shaft portions has a right-handed screw and another one of the shaft portions has a left-handed screw.

5. The centrifugal field-flow fractionation device according to claim 1, wherein the pair of contact surfaces include a positioning portion configured to position the wedge-shaped member between the opposite ends of the fixing member.

6. A centrifugal field-flow fractionation device comprising:

a rotor having an annular shape and configured to rotate about a rotation axis;

a channel member
having an arc shape,
provided along an inner peripheral surface of the rotor,
having an outer peripheral surface having an arc shape and formed on a side of the rotor, and an inner peripheral surface having an arc shape and formed on a side of the rotation axis,
including a channel for a liquid sample, and
having an inlet in which the liquid sample flows into the channel, and an outlet in which the liquid sample flows out from the channel;

a fixing member having an arc shape and provided along the inner peripheral surface of the channel member on the side of the rotation axis with respect to the channel member;

a wedge-shaped member attached between opposite ends of the fixing member, and configured to apply a force in a direction of spreading the opposite ends apart, so that the fixing member is pressed toward the inner peripheral surface of the rotor; and a rotary actuator configured to rotate the rotor to classify particles in a liquid sample in the channel by centrifugal force, wherein the wedge-shaped member has a pair of contact surfaces that respectively come into contact with the opposite ends of the fixing member, and an adjustment mechanism configured to adjust a distance between the pair of contact surfaces.

* * * * *